June 5, 1923.
M. A. MARQUETTE
1,457,986
METHOD OF PREPARING INNER TUBES FOR VULCANIZATION
Original Filed Sept. 19, 1919
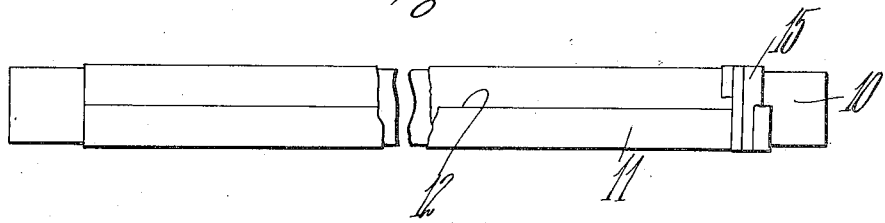
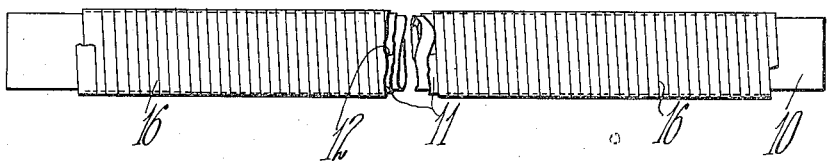
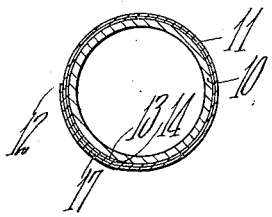
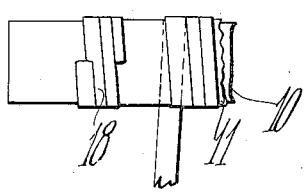
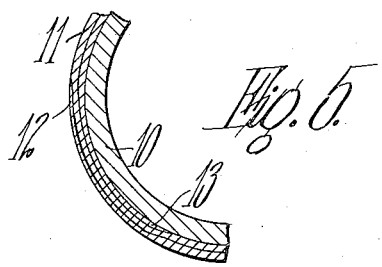
INVENTOR
Nelson A. Marquette
BY Chapin + Neal
ATTORNEYS.

Patented June 5, 1923.

1,457,986

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF PREPARING INNER TUBES FOR VULCANIZATION.

Application filed September 19, 1919, Serial No. 324,845. Renewed January 9, 1923.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Methods of Preparing Inner Tubes for Vulcanization, of which the following is a specification.

My present invention relates to methods of treating rubber articles prior to vulcanization, and particularly to methods of preparing rubber tubes for vulcanization.

It has for its object a method which will decrease the time necessary for handling tubes, and which will at the same time improve the product.

In one method previously used a rubber tube was mounted on a mandrel, one end was taped, the tube was wrapped helically from that end to the other with a strip of fabric, the wrapped tube was allowed to stand for a period of time sufficient to permit the uncured rubber to flow, the cross wrapping of fabric was removed, and the tube was vulcanized in the usual way. I have found that by giving the tube a preliminary warming it is possible to shorten the period which was previously required to obtain a proper amount of permanent flowing of the rubber. This is due to the fact that the heat softens the rubber and causes it to flow much more readily and quickly, and under a much smaller amount of tension in the fabric. I take advantage of this latter result in preserving the fabric used in cross-wrapping, the fabric used in practicing the present invention being applied to the tube under a tension which is generally less than that necessary to produce flowing of the rubber under the former practice. By thus reducing the deleterious strain under which the fabric was wound I am enabled to greatly increase the life of the fabric strip.

My invention will now be described with reference to the accompanying drawings in which—

Fig. 1 shows a mandrel with a sheet of rubber wrapped about it to form a tube, and with one end of the tube sealed to the mandrel by adhesive tape;

Fig. 2 shows the mandrel and tube after the fabric wrapping has been applied;

Fig. 3 is a sectional view of the mandrel and rubber;

Fig. 4 is a detail illustrative of the application of adhesive tape to seal the second end of the tube to the mandrel; and Fig. 5 is an enlarged sectional detail of the mandrel and tube, showing the disposition of the several plies of rubber at the longitudinal joint after the wrapping has been applied for a period long enough to set the rubber in position.

The first operation is mounting the flat sheet of rubber stock 11 upon a mandrel, as by rolling it thereon. It is generally preferable to roll the stock twice around the mandrel, as shown in Figs. 1, 3 and 5, but if a heavier stock is used, one turn may be sufficient. With the stock rolled up the two edges of the stock cause ridges 12 and 13, the latter of which, being adjacent to the mandrel, forms a pocket 14 between the stock and the mandrel in which air may be entrapped. The tube may be mounted on the mandrel in any other way, if desired. The next operation is sealing one end of the rubber tube to the mandrel by adhesive tape 15 so as to form an air-tight joint. The tube is then tightly wrapped to the mandrel from that end to the other by a long strip of fabric 16, which is wound helically over the whole length of the tube and is fastened in place in any suitable way, as by drawing the end of the fabric between two previously formed turns, or by fastening it in place by suitable adhesive.

The tube, mounted on the mandrel and with the fabric cross wrapping thereon is then placed in a hot room or heater and given a preliminary warming sufficient to cause the rubber to soften and flow under the pressure of the wrapping. I have found that placing the mandrels in a heater, turning on steam at fifty pounds pressure for about two minutes, and then removing the mandrels from the heater will give excellent results. It will be understood that the exact time and temperature are immaterial provided that the heat is sufficient to soften the rubber so as to allow it to flow readily. Preferably, the heating is not made sufficient to cause vulcanization of the rubber. By this heating the rubber is caused to flow to enter pocket 14 and expel the air therefrom, and is also deprived temporarily of its elasticity so that it has no tendency to return to its original form.

The condition of the joint at this stage is illustrated in Fig. 5. It should be noted that the pocket 14 has completely disappeared, and that the edges 12 and 13 have been thinned so that they are practically continuous with the body of the other plies. This is especially true in the case of edge 13, as this bears directly against the smooth mandrel. Another effect of the setting of the stock under the pressure of the fabric is to reduce the enlargement 17 caused by the overlapping of the several plies of fabric at the joint. The excess stock at this point flows into the adjacent parts, the result being a tube of substantially even thickness.

After the above operations have taken place, the fabric 16 is partially removed from the tube, as shown in Fig. 4, and the second end of the tube sealed to the mandrel by a strip of adhesive tape 18. The wrapping is then entirely removed, and the tube is ready for vulcanization. If it is desirable from considerations of convenience to have the wrapping upon the tube for a longer period than that necessary to effect the setting of the rubber this will do no harm, as when the rubber reaches its compact condition, it can flow no further.

Vulcanization can be accomplished in any one of the known methods, either by supplying steam to the interior of the mandrel or by placing the tube and mandrel in a heater. The vulcanizing operation is however, carried on without any wrapping being upon the tube. This saves the large expense of the fabric formerly used upon the tubes during vulcanization, and which was destroyed by the dampness and heat after use for several times.

I claim—

1. The method of preparing rubber tubes for vulcanization consisting in mounting the tube upon the mandrel, wrapping the tube with a strip of fabric, subjecting the tube with the wrapping thereon to a preliminary warming, and removing the wrapping.

2. The method of preparing rubber tubes for vulcanization consisting in mounting the tube upon a mandrel, compressing it against the mandrel, subjecting the tube to a preliminary warming while maintaining the compressing means in position, and removing the compressing means prior to vulcanization.

3. The method of preparing rubber tubes for vulcanization consisting in mounting the tube upon a mandrel, compressing it against the mandrel, subjecting the tube to a preliminary warming at a temperature corresponding to that of steam at substantially fifty pounds pressure for a period of time of approximately two minutes while maintaining the compressing means in position and removing the compressing means prior to vulcanization.

4. The method of preparing rubber tubes for vulcanization consisting in mounting a tube upon a mandrel, sealing one end of the tube to the mandrel, wrapping the tube helically with a strip of fabric, subjecting the tube with the wrapping thereon to a preliminary warming, and removing the wrapping.

5. The method of preparing rubber tubes for vulcanization consisting in mounting a tube upon a mandrel, sealing one end of the tube to the mandrel, wrapping the tube helically from that end to the other with a strip of fabric, subjecting the tube with the fabric thereon to a preliminary warming, sealing the second end of the tube to the mandrel, and removing the fabric.

6. The method of preparing rubber tubes for vulcanization consisting in mounting a tube upon a mandrel, sealing one end of the tube to the mandrel, wrapping the tube helically with a strip of fabric, subjecting the tube with the wrapping thereon to a preliminary heating at a temperature corresponding to that of steam at substantially fifty pounds pressure for a period of time of approximately two minutes, sealing the second end of the tube to the mandrel, and removing the wrapping.

MELVON A. MARQUETTE.